S. T. DAVIS.
PNEUMATIC TIRE.
APPLICATION FILED AUG. 7, 1917.
1,248,089.
Patented Nov. 27, 1917.
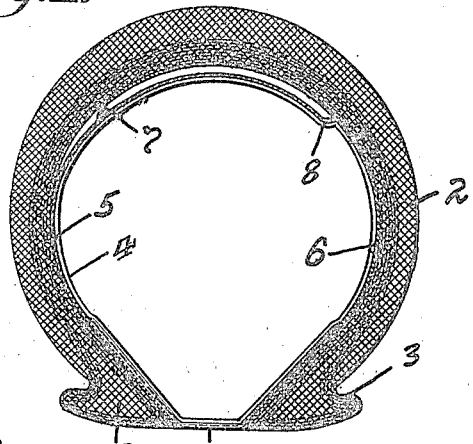
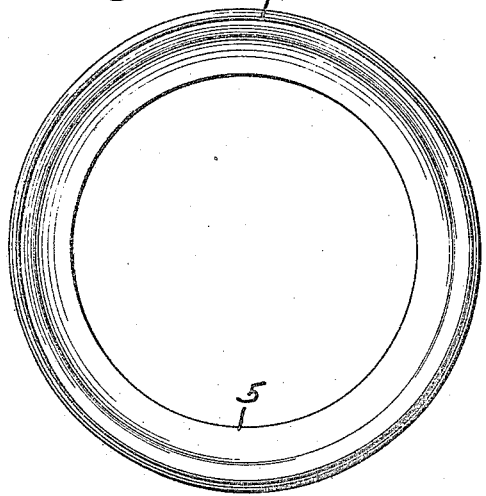
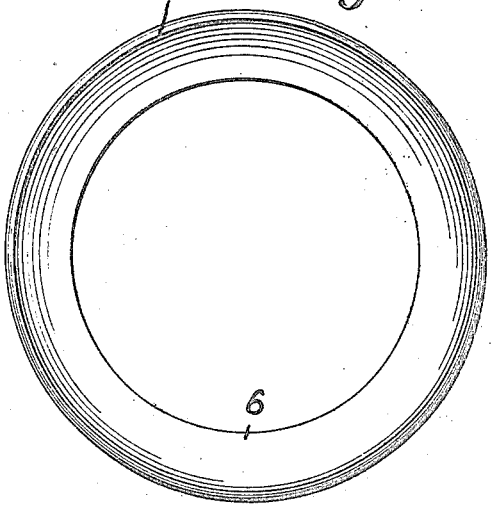
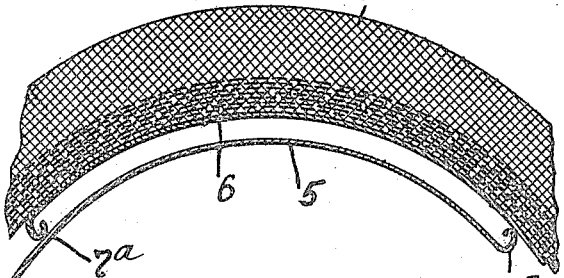
Witnesses:
John E. Jackson
Lois Brieman
Inventor:
Samuel T. Davis,
By J. W. Cooke
Attorney

UNITED STATES PATENT OFFICE.

SAMUEL T. DAVIS, OF PITTSBURGH, PENNSYLVANIA, ASSIGNOR OF ONE-HALF TO JAMES S. DEMETRIOU, OF PITTSBURGH, PENNSYLVANIA.

PNEUMATIC TIRE.

1,248,089. Specification of Letters Patent. Patented Nov. 27, 1917.

Application filed August 7, 1917. Serial No. 184,882.

*To all whom it may concern:*

Be it known that I, SAMUEL T. DAVIS, a resident of Pittsburgh, in the county of Allegheny and State of Pennsylvania, have invented a new and useful Improvement in Pneumatic Tires; and I do hereby declare the following to be a full, clear, and exact description thereof.

My invention relates to pneumatic tires and more particularly to internal armors for such tires.

The main object of my invention is to provide a device of this class that will not destroy the resiliency of the pneumatic tire or require any change in the present construction of tire casings or tubes.

Another and very important object is to provide such an inner-liner that will not injure or cut the inner tube or tire casing in any manner, but, on the contrary, will lengthen their life considerably.

While I have shown and described preferred forms of my invention in the drawings and specification, it will be apparent that various changes in constructions and design may be made without departing from the spirit of my invention, as defined in the appended claims.

In the drawings,

Figure 1 is a cross sectional view of a tire having my inner-liner in operative position therein;

Fig. 2 is a plan view of the left-hand member of my inner-liner;

Fig. 3 is a similar view of the right-hand member; and

Fig. 4 is a fragmentary view showing a modified construction of bearing edge for my inner-liner members.

Referring more particularly to the drawings, the numeral 2 designates a casing of a tire having the usual clencher portions 3, and the numeral 4 designates an inner tube of the usual construction.

My inner-liner is adapted to be inserted between the inner tube 4 and the casing or shoe 2 and comprises members 5 and 6 preferably formed of spring metal and each being in the form of a ring having a curved cross section and extending around the entire circumference of the casing, but extending only part way of the width or over the tread portion of the tire and downward to the clencher portion of each side, thus leaving at all times a double thickness of metal at the tread portion, and providing for a telescoping action of said members when the tire is compressed.

The member 6 has its outer edge or the edge nearest the tread portion of the casing bent downward at an angle to form a sharp or hard bearing portion 7 against member 5, and thereby prevent such edge from cutting or digging into the casing or shoe 2. The member 5 has its edge nearest the tread portion of the casing or its outer edge bent upwardly on an angle similar to the member 7 on the member 6 forming a like bearing 8 adapted to bear against the inner surface of the member 6.

It will be readily seen that the bearing portions 7 and 8 as formed on the members 6 and 5 respectively will form a hard or stiff bearing and therefore prevent any sharp edges from coming into contact with the rubber portions of a tire.

Within the casing 2 is a usual canvas liner 9 around the base of such shoe to prevent the inner tube from coming into contact with the metallic rim, and such liner 9 serves a dual purpose in applicant's structure, in that it prevents the lower edge of his metallic inner-liner from contacting with the tube 4.

In Fig. 4, I have shown a modified form of bearing edge for the members 5 and 6. Members 5 and 6 are fitted within the casing 2 in the same manner as in the form shown in Figs. 1–3. The bearing edges of the modified structure, however, are formed slightly different and are designated by the numerals $7^a$ and $8^a$. The edges $7^a$ and $8^a$ are formed so as to provide a rounded bearing surface instead of a sharp bearing surface as in the preferred form.

It will be understood that the members 5 and 6 may be made in two or more pieces for convenience in manufacture, if desired, and secured together, and such a construction would have the same effect as a single piece, as shown.

Having thus described my invention, what I claim is:—

1. An inner-liner for pneumatic tires comprising a plurality of circular sections, said sections being adapted to overlap each other forming a double tread portion and to have a transverse telescoping action when compressed, and bearing portions formed on the outer edges of said sections adapted to space said overlapped portions and prevent the pinching of the inner tube.

2. A metallic inner-liner for pneumatic tires comprising a plurality of continuous circular sections, said sections being adapted to overlap each other at the tread portion and having a transverse telescoping action when compressed, and the edge of each of said sections adjacent the overlapped portion being bent toward the other section to form hard bearing members.

In testimony whereof, I the said SAMUEL T. DAVIS, have hereunto set my hand.

SAMUEL T. DAVIS.

Witnesses:
J. N. COOKE,
JOHN E. JACKSON.

Copies of this patent may be obtained for five cents each, by addressing the "Commissioner of Patents, Washington, D. C."